United States Patent
Florissi et al.

(10) Patent No.: US 7,464,132 B1
(45) Date of Patent: Dec. 9, 2008

(54) METHOD AND APPARATUS FOR REFERENCE MODEL CHANGE GENERATION IN MANAGED SYSTEMS

(75) Inventors: Danilo Florissi, Briarcliff Manor, NY (US); Salvatore DeSimone, Woodbury, CT (US); Schmuel Kliger, Chappaqua, NY (US); Chao-Wei Ou, Poughkeepsie, NY (US); Howard H. Green, Carlsbad, CA (US); Martin H. Wexler, San Diego, CA (US)

(73) Assignee: EMC Corporation, Hopkinton, MA (US)

( * ) Notice: Subject to any disclaimer, the term of this patent is extended or adjusted under 35 U.S.C. 154(b) by 270 days.

(21) Appl. No.: 11/241,338

(22) Filed: Sep. 30, 2005

Related U.S. Application Data (63) Continuation-in-part of application No. 10/171,288, filed on Jun. 12, 2002, now Pat. No. 6,990,520.

(51) Int. Cl.
*G06F 15/16* (2006.01)
*G06F 15/177* (2006.01)
*G06F 15/173* (2006.01)
*G06F 17/50* (2006.01)
*G06F 9/44* (2006.01)

(52) U.S. Cl. .................. 709/200; 709/220; 709/224; 703/13; 703/21

(58) Field of Classification Search ................. 709/200, 709/220, 224; 703/13, 21
See application file for complete search history.

(56) References Cited

U.S. PATENT DOCUMENTS

| | | | | |
|---|---|---|---|---|
| 6,249,755 | B1 * | 6/2001 | Yemini et al. | ................ 702/183 |
| 6,868,367 | B2 * | 3/2005 | Yemini et al. | ................ 702/183 |
| 7,003,433 | B2 * | 2/2006 | Yemini et al. | ................ 702/183 |

* cited by examiner

*Primary Examiner*—Ario Etienne
*Assistant Examiner*—El Hadji M Sall
(74) *Attorney, Agent, or Firm*—Krishnendu Gupta; Jason A. Reyes; Joseph D'Angelo (57) ABSTRACT

A method and apparatus for specifying and generating an alteration in a model representative of a system composed of a plurality of components, the method comprising the steps of associating configuration non-specific representations with corresponding functions operable on the model, each of the configuration non-specific representations includes representations of objects and attributes of, and/or relationships among system components, associating configuration non-specific representations of desired changes to the model for enabling alterations to the objects, attributes, relationships and/or functions of the objects, attributes and relationships subject to constraints imposed by attributes of the system, and applying the configuration non-specific represented changes to the configuration of a baseline model representation of the system to generate a new configuration non-specific model where the changes have been applied.

2 Claims, 12 Drawing Sheets

```
Template::T01 {
  LHS = {
    ReplicatedApplication::[Rep_App] {
    Operation = {creates} .
    Constraints = {
      _Final=False, DiskSize=[DS], MemorySize=[MS], Replicas=[R] } } }
  RHS = {
    Host::[H] {
      Operation = {allocate} ,
      ConsistsOf = {
        Disk::[D] {
          Operation = {allocate} ,
          Constraints = {_Final=False, Size >= [DS]}
        } ,
        Memory::[M] {
          Operation = {allocate} ,
          Constraints = {_Final=False, Size >= [MS]}
        }
      }
    }
  }
}
```
— 260

1. Let Snew be the initial baseline.
2. Let O(_E) the object associated with event _E.
3. Let T->lhs be the set of objects in the left hand side of the template T.
4. Subscribe to _E_Final events.
5. For the whole set of active event _E_Final:
    1. Match set of (O(_E_Final)) objects with lhs of templates. Let {T} be the set of resulting templates.
    2. If |{T}|>1, prompt external source to select unique Tu among {T}.
    3. Let Tu->rhs be the set of object in the rhs of Tu. Notice that T->rhs includes T->lhs
    4. Push objects in T->rhs in stack S1.
    5. While S1 is not empty:
        1. Execute (Top(S1)). Save all possible resulting baselines into stack S2. [Note: the implementation may keep enough state to reconstitute the baselines instead of computing all of them.]
        2. If success, pop top of S2 and use this as the current baseline. Pop S1.
        3. If failure and S2 not empty, use Top(S2) as the baseline, pop S2, and break to 5.6.
        4. If failure and S2 empty, fail; baseline cannot be found.

METHOD AND APPARATUS FOR REFERENCE MODEL CHANGE GENERATION IN MANAGED SYSTEMS

CLAIM OF PRIORITY

This application is a continuation-in-part, and claims, pursuant to 35 USC 120 the benefit of the earlier filing date, of that patent application entitled "System and Method for Managing Computer Networks," filed Jun. 12, 2002 now U.S. Pat. No. 6,990,520 and afforded Ser. No. 10/171,288, the contents of which are incorporated by reference herein.

RELATED APPLICATION

This application is related to commonly-owned, concurrently filed entitled "System and Method for Managing Computer Networks," concurrently filed and afforded patent application Ser. No. 11/240,164, the contents of which are incorporated by reference herein.

FIELD OF THE INVENTION

This application applies to network and computer systems management and more specifically to the management of network-based systems.

BACKGROUND OF THE INVENTION

Enterprise computing facilities have undergone a transformation over the past few decades from comprising one or more large (mainframe) computer systems to containing multiple complexes of networked computer systems. As used here, the term "complex" denotes such a state of affairs. A complex can comprise a collection of physical components that are under common administration, such as networks and associated physical components, such as routers, switches, hubs, repeaters, and end devices attached to the networks. Typical end devices can include servers, special-purpose "appliance" systems and storage systems. Within the context of a complex, physical components can be customized through various configuration parameters to produce specific logical resources (e.g., host systems on servers, or storage volumes on storage systems) or specific behaviors (e.g., access controls or recovery procedures).

The sheer volume and diversity of technologies, components and interconnections in such complexes have imposed well-known challenges in the areas of administration, management and maintenance. The recent advent of specialized networks, such as Storage Area Networks, System Area Networks and Server Area Networks (all of which are referred to as "SANs"), has merely added another dimension to traditional management problems.

Given that a complex consists of many interconnected and individually configured components, a problem can arise of ensuring that the complex is in fact constructed and configured in the ways that its designers intend.

For example, when initially installing or upgrading a complex, there is a need to ensure that the installed complex is a faithful replica of the intended design. This includes verifying that the correct types and quantities of components are in place, and that they are correctly interconnected.

In addition, while a complex is in operation, there is a need to evaluate the effects of changes observed in the complex. For example, if a new device is plugged into a network, it could be an authorized event (e.g., if the device is known to be part of the complex and has recovered following a failure) or an unauthorized event (e.g., the device is not an authorized part of the complex, or is connected to an incorrect network or at an incorrect location on the correct network.

Further, where components of a complex are configurable or programmable (e.g., have options, settings, or adjustments, or contain alterable program material such as firmware) there is a need to ensure that such components are configured or programmed in an acceptable fashion, and to take remedial action if they are not.

Various tools for managing networks and computer systems exist, and many of them incorporate means by which an administrator's intent regarding certain aspects of a network can be recorded and assessed. However, the representation of intentions in existing products has a number of drawbacks.

First, the representation of intent is fragmented across multiple sources, and in multiple forms. Often, management products are built as multiple separate domain-specific management systems (e.g., one application for managing storage, another for managing servers, yet another for managing networks) each of which incorporates its own conventions for representing an intended state.

Another drawback relates to the fact that such operations as assigning complex-based resources to particular applications requires visibility across many domains because an application typically requires servers and storage and capacity on multiple networks. Fragmented information, however, makes this analysis more difficult.

As another drawback, the intended state of a network is generally not explicitly represented, or may be ambiguously intermixed with operational data to the extent that distinguishing what is intended and what is merely an artifact of the current state of the complex is difficult or impossible.

Further, many existing management products depend upon an initial discovery operation to assess the content of some domain (e.g., a network, or servers attached to a network), and then to use the results of the discovery to create a database. One drawback to this approach is that elements of the domain that are not present or functioning during discovery may never be entered into the database. Further, elements that are not intended to be part of the domain may be erroneously entered into the database. While the database can be eventually modified into a reasonable representation of the domain's intended state it can only achieve that status by a careful evaluation and editing after the initial discovery operation. This typically requires the on-site services of an expert in the domain, and because the comparison process is manual, is prone to error.

Several models have been designed for constructing management systems over related domains (typically, for network management). For example, typical network managers, such as the OpenView® Network Node Manager made by Hewlett Packard Company, perform various discovery and monitoring operations and representations of devices encountered during discovery are placed into a database. Database contents are maintained until removed by an administrator. The database thus records a history describing what elements of a network have been encountered over time. This allows a network administrator to determine when the state of elements within the network have changed.

In this model the results of the discovery operation can differ from an administrator's intent in several ways. First, if a device is not operational at the time discovery is performed, the network complex will not discover it. Second, because not all devices are discovered and recorded, the database may have either too few or too many devices relative to the administrator's intentions. While these network managers typically provide tools to allow an administrator to edit the database (e.g., adding missing devices or deleting extra ones), this manual task is time-consuming and prone to error. In addition, the edit process typically requires substantial expertise on the part of the personnel doing the editing.

Hence, in one aspect of network management there is a need in the industry for a method and apparatus that allows a client to alter the contents of a reference model to provide an updated reference model, which may then be stored and subsequently implemented.

SUMMARY

A method and apparatus for specifying and generating an alteration in a model representative of a system composed of a plurality of components, the method comprising the steps of associating configuration non-specific representations with corresponding functions operable on the model, each of the configuration non-specific representations includes representations of objects and attributes of, and/or relationships among system components, associating configuration non-specific representations of desired changes to the model for enabling alterations to the objects, attributes, relationships and/or functions of the objects, attributes and relationships subject to constraints imposed by attributes of the system, and applying the configuration non-specific represented changes to the configuration of a baseline model representation of the system to generate a new configuration non-specific model where the changes have been applied

DETAILED DESCRIPTION

Figure 1A:
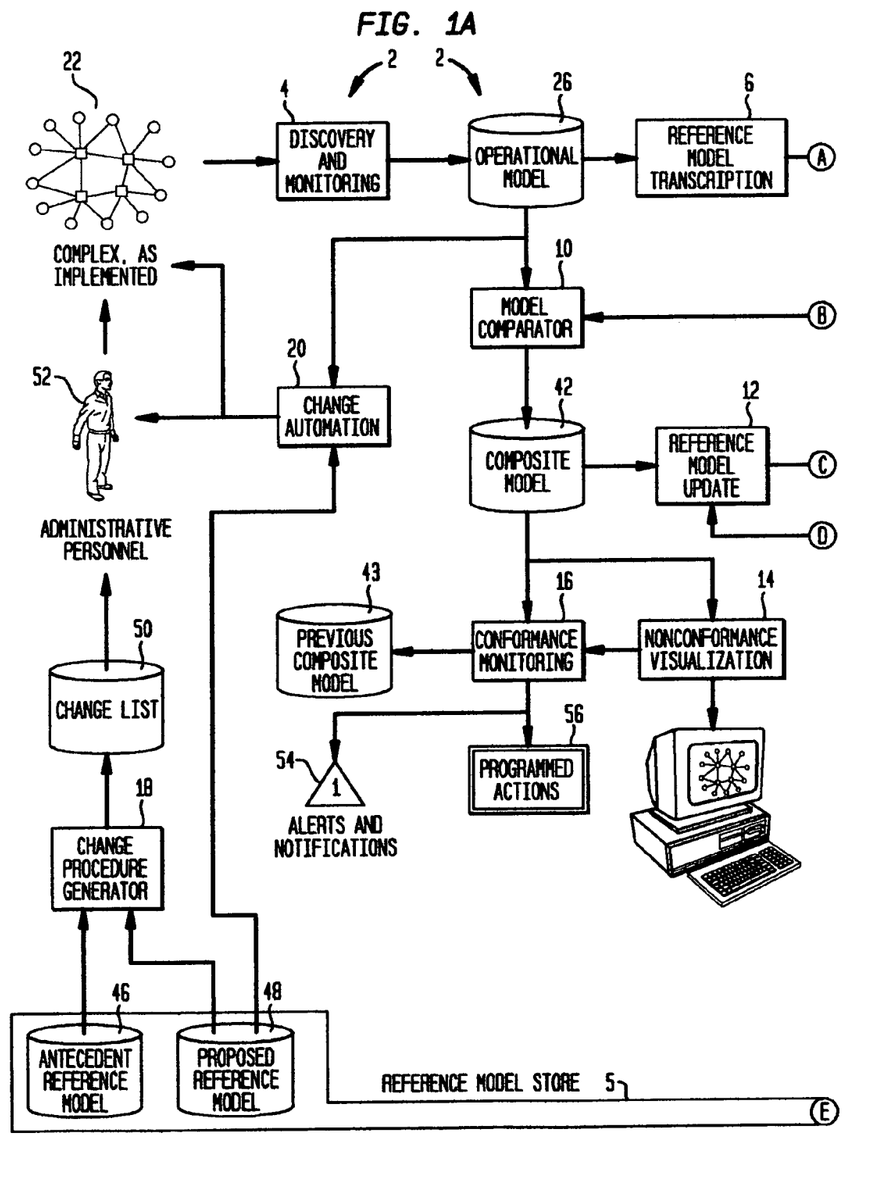
FIG. 1 represents a schematic view of a complex management system of the present invention.
Figure 1B:
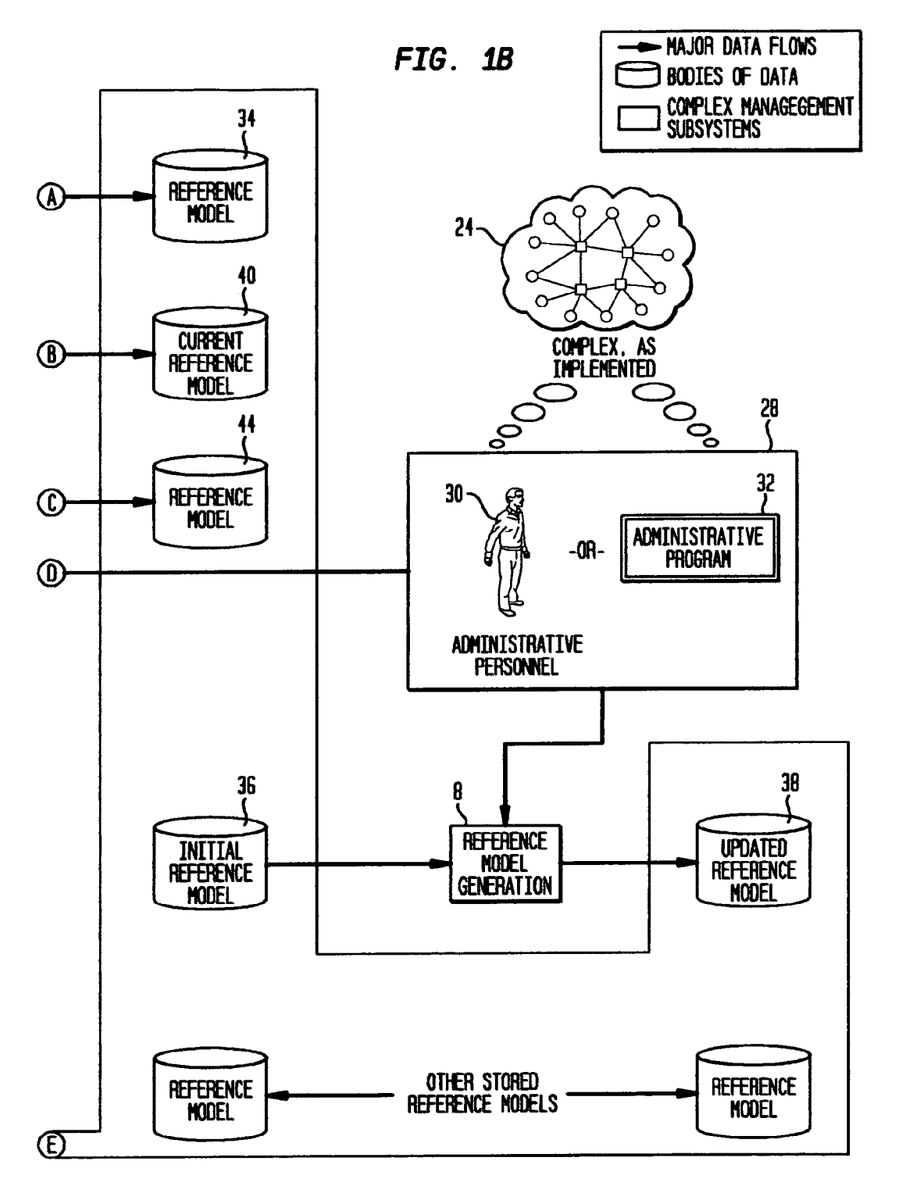

An illustrative embodiment of the complex manager system 2 of the present invention is shown in FIG. 1 (shown as FIGS. 1A and 1B). The complex manager 2 not only analyzes information about a complex's actual state shown as complex, as implemented 22, but also represents, captures and makes use of information regarding how the complex is supposed to be constituted (shown in FIG. 1 as complex, as intended 24). In an embodiment, the complex manager 2 allows administrative clients 28 to develop and record their intentions concerning the correct state of a complex, and to derive various results based on these intentions. In an embodiment, the administrative clients comprise administrative personnel 30 responsible for the design and upkeep of the network, or administrative computer programs 32 or systems acting on their behalf.

More specifically, the requirements of interest here are related to dealing with the intentions of an administrator relating to a complex. For example, a system of the present invention can represent and record the characteristics of a complex that an administrator considers to be necessary to the complex's correct construction and operation and can also verify that the realization of the complex in fact matches the administrator's intentions. Further, the system can alert administrators or take remedial action in the event that discrepancies are found to exist between realized and intended states of a complex. The system can also help administrators to understand the nature or cause of reported discrepancies between the real and intended states of a complex. Further, the system of the present invention assists administrators in making changes to a complex as administrators' intentions regarding the complex change over time. This can involve, for example, representing and recording the intended characteristics of a future or proposed form of a complex; ensuring the completeness and logical consistency of the future or proposed form of a complex; determining what intended characteristics change between a current and future form of a complex; devising a procedure for effecting the changes between a current and future form of a complex; effecting the changes necessary to alter a complex's realization from one intended form to another, and verifying that the changes have been successfully realized.

The complex manager system 2 performs its various functions based upon representations of a complex. In an embodiment, such representations are manifested in a form that is meaningful to computer programs (e.g., a set of memory-based data structures, or a database), and is termed a model of the complex. Because a model is typically a collection of computer-based data, it is subject to any or all of the many operations applicable to such bodies of data. A model can, for example, be permanently stored (as in a disk-based file), retrieved, copied, updated, edited, etc.

A model describes various aspects of a complex's state and in one embodiment, comprises a set of one or more objects. Each object represents some element or component within the complex. For example, objects can include the complex itself; the set of networks within the complex, and for each network, the network components that realize the network, including such developments as network routers, switches, hubs, bridges, protocol converters, and the like; the end devices that are attached to the networks, such as servers, specialized "appliance" or storage systems, and their internal components (e.g., adapters, ports, etc.); the interconnections within the network, as between the network components and end devices, or between network components; and provisioned objects that arise as the result of configuration or programming of the objects above, such as storage volumes, virtual private networks or host systems. Each object within a model contains of a set of attributes, which are elements of data that further define the nature, condition, behavior or state of the object. For example, attributes can define the identity of the object, a level of required firmware, policies describing such behaviors as exception handling or access control, and the enabled/disabled state of ports.

In an embodiment, the complex manager system 2 deals with two distinct types of models: an operational model and a reference model. An operational model is a representation of the actual state of the complex as it existed at some point in time. A reference model is a representation of the intended state of the network.

In an embodiment, the complex manager system 2 is a computer-based system manifested as a set of programmed subsystems that execute on conventional computer systems. Some of these subsystems are dependent on resources or information available only from the complex, and as a consequence execute within computer systems that are part of the complex. However, other subsystems of the complex manager system 2 may depend only on a reference model, and consequently can execute on computer systems that are not part of the complex.

FIG. 1 schematically illustrates the complex manager system 2 and the principal information flows within the system.

In an embodiment, the complex manager system 2 comprises a discovery and monitoring subsystem 4, a reference model store subsystem 5, a reference model transcription system 6, a reference model generation subsystem 8, a model comparator subsystem 10, a reference model update subsystem 12, a nonconformance visualization subsystem 14, a conformance monitoring subsystem 16, a change procedure generator subsystem 18 and a change automation subsystem 20.

The primary task of the discovery and monitoring subsystem 4 is to perform an initial assessment of a complex, as implemented 22, to ascertain the nature and state of all of the complex's networks, network components, and systems attached to the network, as well as the presence, nature, and structure of the interconnections within such networks. On the basis of this information, the discovery and monitoring subsystem 4 constructs an operational model 26 of the complex as implemented 22.

Once the initial operational model 26 has been constructed, the discovery and monitoring subsystem 4 continues to assess the structure and content of the complex, as implemented 22. Through such means as periodically re-executing its discovery process, or by monitoring indications of change emanating from the complex, as implemented 22, the discovery and monitoring subsystem 4 becomes aware of changes in the complex as implemented 22, and updates the operational model 26 accordingly.

The discovery and monitoring subsystem 4 can implement a variety of well-known means to establish the content of the complex, as implemented 22. For example, these means may include such tools as the Simple Network Management Protocol (SNMP); or the Desktop Management Interface (DMI); or the Common Information Model (CIM) technology, as manifested, for example, by Microsoft Corporation's Windows Management Interface; and/or proprietary and/or vendor- or product-specific interfaces intended for retrieving device-related information.

In operation, the discovery and monitoring subsystem 4 first undertakes an initial discovery operation. In an embodiment, this can include sending a "ping" packet to each network address within a prescribed range. This ping packet then elicits a corresponding response packet from the remote device to which it is addressed. For each remote device that returns a "ping" response, the discovery and monitoring subsystem 4 sends further queries, using any or all of the tools above, to determine the nature, internal structure, and operational state of the responding device. In addition, in situations where the responding device has connections to one or more networks, the discovery and monitoring subsystem 4 specifically queries the device to ascertain the set of remote devices with which the responding device is connected.

After the initial discovery operation, the discovery and monitoring subsystem 4 creates one or more objects representing the identified device(s), any device(s) connected to them, and the connections between the device(s). For each device, the representative object contains a set of attributes appropriate to the nature of the object and that describe the identity, nature, and operational state of the device, and its relationships to other devices. For connections between devices, the corresponding object contains the identity of each of the devices involved in the connection. These objects are then stored as part of the operational model 26.

Periodically, for each object in its database, the discovery and monitoring subsystem 4 repeats its queries to the device. If the device fails to respond, the discovery and monitoring subsystem 4 marks the objects corresponding to the device as being non-responsive. If the device does respond, the discovery and monitoring subsystem 4 determines any changes between the device's current state and the state of the device as represented by the stored objects. If changes have occurred, the discovery and monitoring subsystem 4 updates the objects corresponding to the device.

On a periodic basis, the discovery and monitoring subsystem 4 repeats the discovery process by sending a "ping" packet to each network address within a prescribed range. For each network device that responds, the discovery and monitoring subsystem 4 queries the responding device as described above. The discovery and monitoring subsystem 4 then attempts to match the identity of the responding device with corresponding objects. If no corresponding objects exist, the discovery and monitoring subsystem 4 takes note of the newly discovered device by creating and storing representations of these devices.

The reference model store subsystem 5 provides persistent storage for a multiplicity of reference models. The reference model store subsystem 5 acts as a recipient for reference models generated as output by the other subsystems, storing those reference models pending future use. Similarly, the reference model store subsystem 5 acts as a source for reference models used as input by other subsystems.

In an embodiment, the reference model store subsystem 5 can be a computer system's file system, wherein reference models are stored in the form of files.

The reference model transcription subsystem 6 first ensures that the operational model 26 remains in a constant state, and then performs an object-by-object copy of the operational model 26 to create an output reference model 34, which is stored by the reference model store subsystem 5.

The reference model generation subsystem 8 receives as its input a reference model 36 from the reference model store subsystem 5 and allows an administrative client 28 to alter its content to provide an updated reference model 38, which is then stored in the reference model store subsystem 5.

In an embodiment, the reference model generation subsystem 8 can be an "editor" program that graphically displays the content of the reference model, and accepts alterations to the existing reference model 36 from administrative personnel 30 via conventional computer input devices, such as a keyboard or mouse. In another embodiment, the reference model generation subsystem 8 can be a library or similar program manifestation that makes available a programmatically accessible interface (e.g., an application program interface ("API")) that allows an administrative computer program 32 to retrieve and/or make alterations to the content of the existing reference model 36. When the administrative client 28 signals that alterations have been completed, the reference model generation subsystem 8 produces an updated reference model 38 as its output, which is then stored in the reference model store subsystem 5.

In an additional mode of operation, the reference model generation subsystem 8 allows an administrative client 28 to specify the content of a brand new reference model 38. In this embodiment, an initial reference model 36 is not required as input. This mode of operation allows the generation of a new reference model 38 that represents the intended content and structure of a proposed complex, as intended 24 that is not necessarily derived from any existing complex.

In an embodiment, the reference model generation subsystem 8 is a procedural interface, such as an API, that provides an administrative computer program 32 with the ability to query, construct, and alter the content of an existing reference model 36. The API can allow additional functions such as a GUI-based editor program to be constructed. The API of the reference model generation subsystem 8 can provide several services, each of which is typically manifested as a set of one or more procedure calls. For example, the API can provide a service for opening and initializing access to a reference model. This service ensures that a designated reference model is present and valid. As an alternative, when an administrative program 32 wishes to specify a new reference model 36, the initialization service creates a reference model that does not contain any objects. The API can also provide a service for retrieving objects contained in the reference model 36. In an embodiment, variants of this service allow retrieval based on object identity or attribute value, or an enumeration of all objects. Another service allows objects contained in the reference model 36 to be updated. This allows programs using the API to make alterations to the content of specific objects already contained in the reference model 36.

Figure 2A:
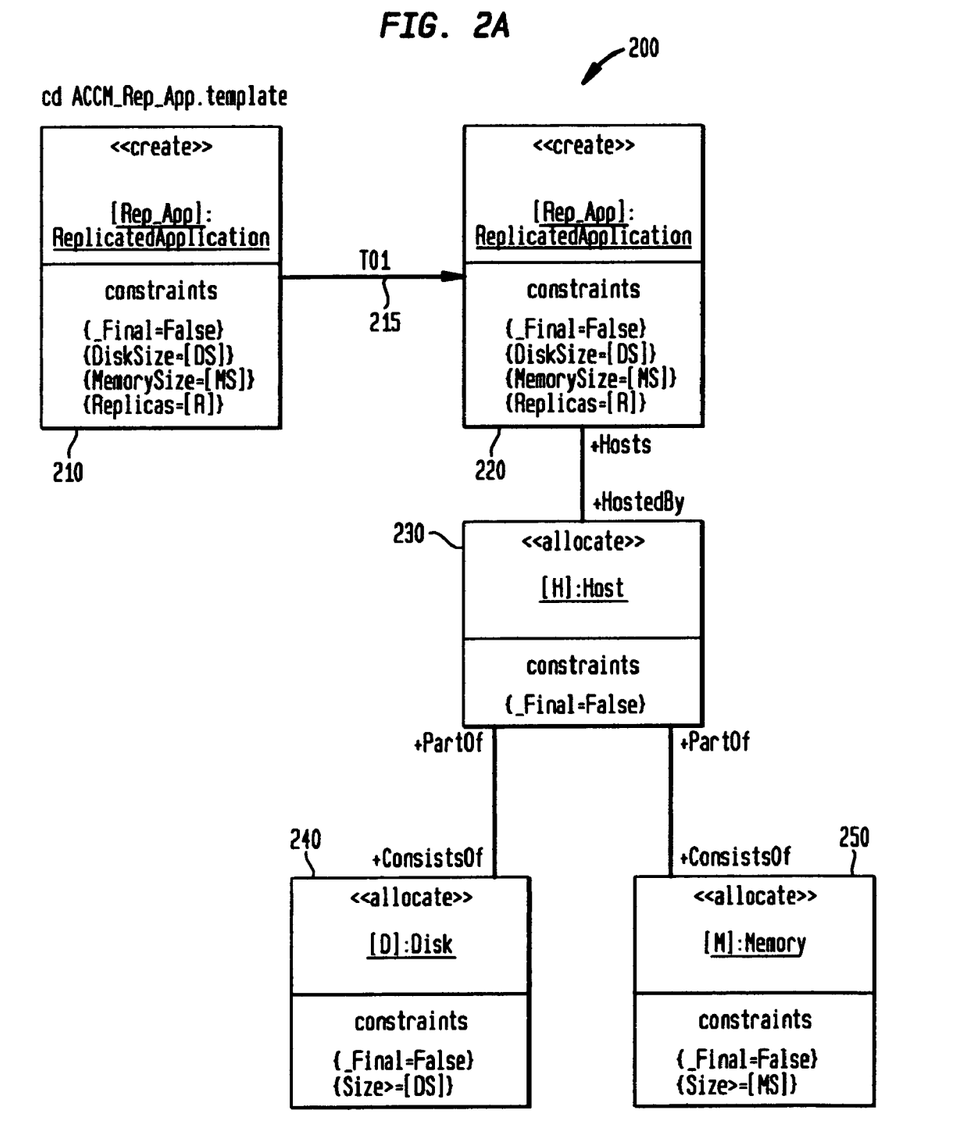
FIG. 2A illustrates an exemplary object template representation of an associated internal operation in accordance with the principles of the invention.

FIG. 2A illustrates an exemplary configuration non-specific or object template representation of an operation associated with the reference model generation subsystem in accordance with the principles of the invention. In this exemplary representation, an object template 210 represents and contains information or attributes of an application, such as the amount of disk space and the amount of memory required to host an application. The object template may receive information associated with changes desired to be made to the complex. For example, a user may enter information associated with a desire change to edit or update or duplicate an existing entity or create a new entity. The user may be presented with a graphic user interface (GUI) that allows entry of data associated with Object template 410. In this illustrated case, Object template 410 is associated with deploying an existing object and, in this case includes information regarding the disk space, i.e., {DiskSize=[DS]} and memory {MemorySize=[MS]} o, i.e., constraints imposed on the system, that are needed to replicate an object, e.g., an application.

Object template 210 may, through an operation object represented as T01, 215, be presented as an object 220 hosted on a server, represented by Host object v30. In this case, the associated server includes a disk component and memory component, which are logically represented by Disk object 240 and Memory object 250. In this illustrated case, Disk object 240 includes an attribute or constraint referred to as {Size>=[DS]} and Memory object 240 includes an attribute or constraint referred to as (Mem>=[MS]).

Although the present invention has been illustrated with regard to a deployment function, it would be understood that operation object T01, v15, may represent operations such as "create," "delete," "update," "edit," and "replicate."

Figure 2B:
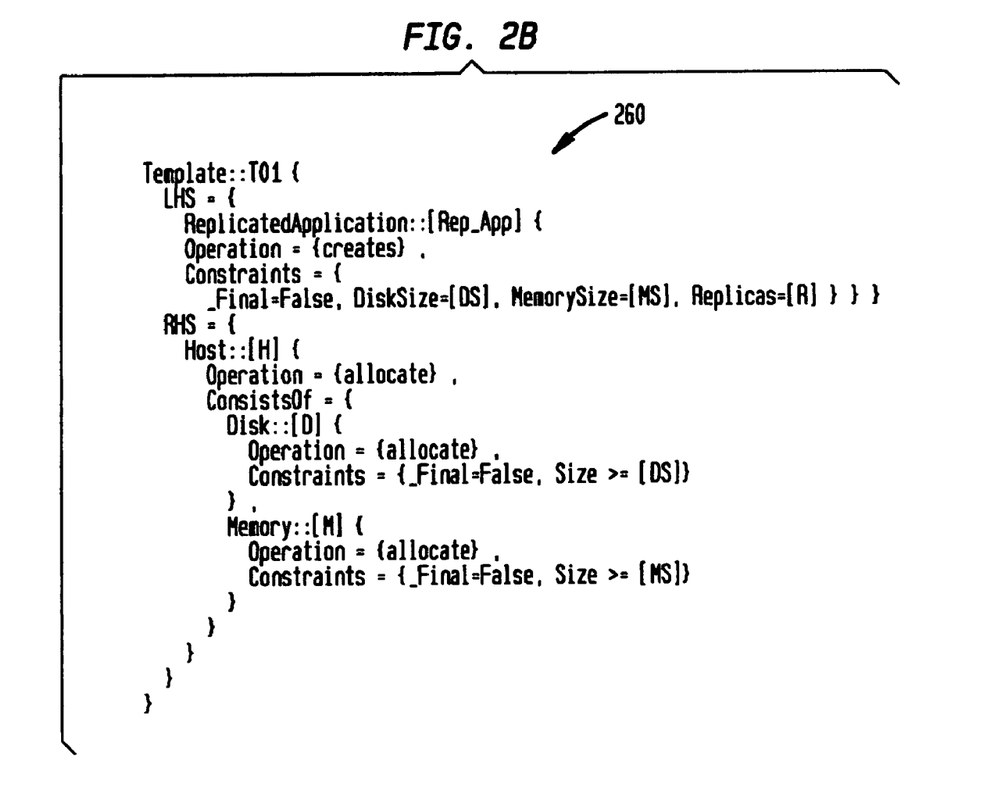
FIG. 2B illustrates an exemplary method for implementing the process shown in FIG. 2A.

FIG. 2B illustrates, in an exemplary pseudo-language (based on UML) computer implementation 260 of the objects represented in FIG. 2A. In this case, the object 215 is represented by template object 210 as LHS possessing a "create" operation attribute and constraint attributes "_Final," "DiskSize," "MemorySize" and "Replicas." The attribute "_Final" represents a flag or indicator that indicates the specific operation has been completed. In this case, "_Final" is initialized at being "False" indicating that the operation has not been completed. Attributes "DiskSize" and "MemorySize" are associated with the disk space and memory size, respectively, required for the desired operation. The Replicas attribute represents the number of hosts upon which application resides or a constraint on the number of hosts that the application may reside. Also shown, and represented as RHS are the objects Host 230, Disk 240 and Memory 250, each possessing an "allocate" operation attribute or constraint.

Figure 3:
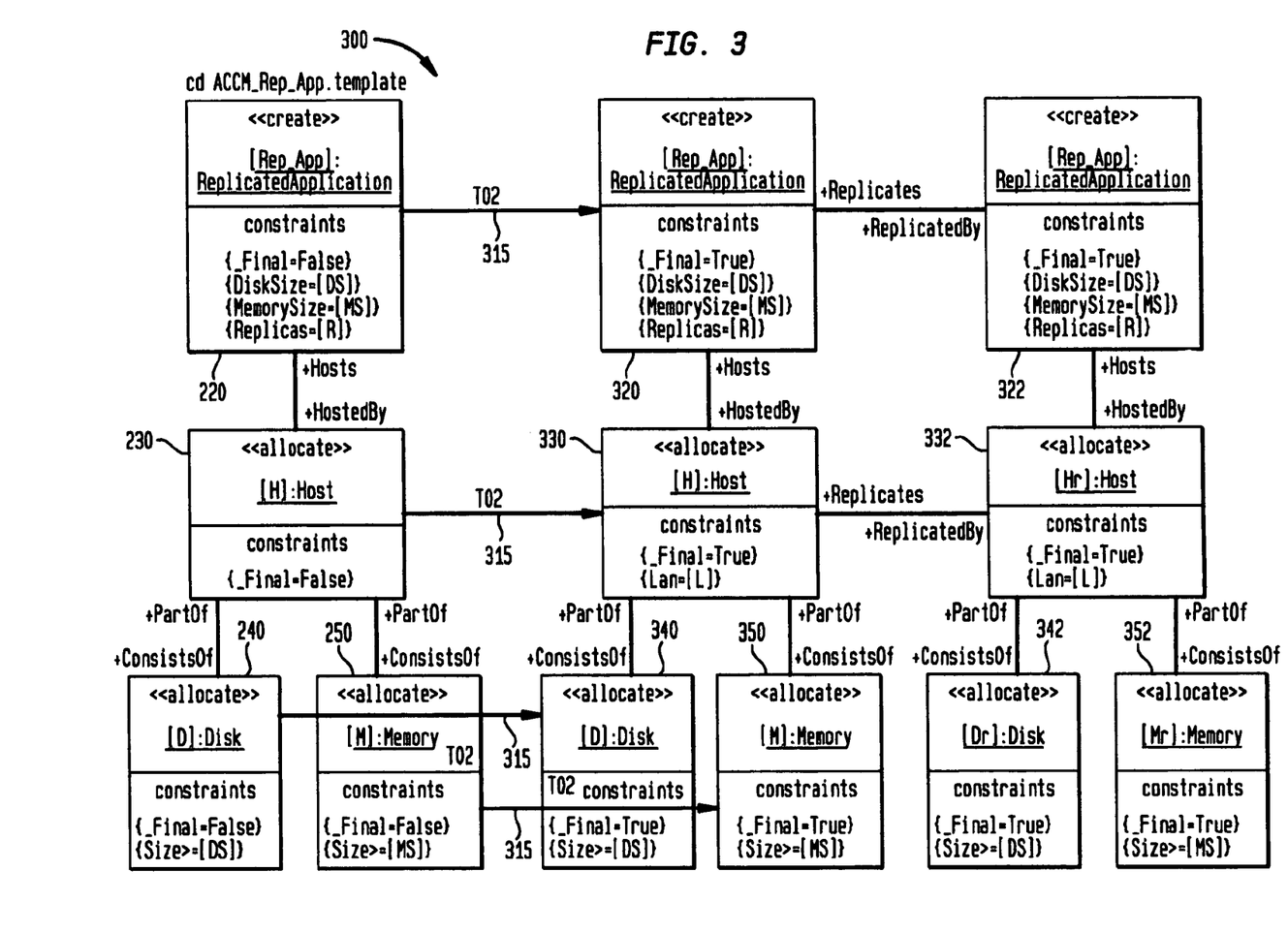
FIG. 3 illustrates a schematic view of a second exemplary abstract representation to an internal representation in accordance with the principles of the invention.

FIG. 3 illustrates a second exemplary template object associated with a replicate operation 300, wherein a deployment object, represented by objects 220, 230, 240 and 250, as shown in FIG. 2A, may be replicated through replication object T02, 315. In this illustrate case replicated object 220 is represented by objects 320 and 322. Host object 230 is replicated by the creation of objects 330 and 332. Disk object 240 is replicated by objects 340 and 242 and Memory object 250 is replicated by objects 350 and 352.

Also illustrated is the replication object 315 having a relationship between object 220 and 320, for example, and object 320 having a "replicates/replicated by" relationship to object 322. The replication is performed from an instance of a master template and subsequent replications are performed from the first replicated instance.

Figure 4A:
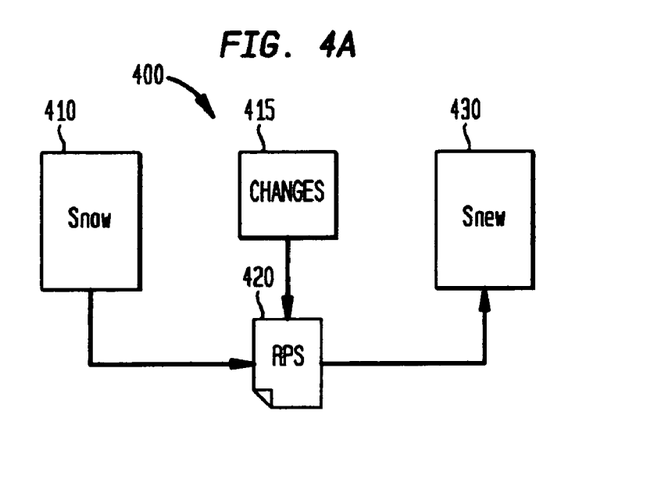
FIG. 4A illustrates a block diagram of the change process in accordance with the principles of the invention.

FIG. 4A illustrates a block diagram of an exemplary reference configuration change generation in accordance with the principles of the invention. In this illustrated example, a reference configuration 410, represented as $S_{now}$, is provided to and copied to a Repository Server, (RPS) 420. Also provided to RPS 420 are desired changes 415. These changes may be provided by an administrator through a graphic user interface, for example. The changes 415 are merged with the information contained in RPS 420 to create a new, desired, configuration, $S_{new}$, 430.

Figure 4B:
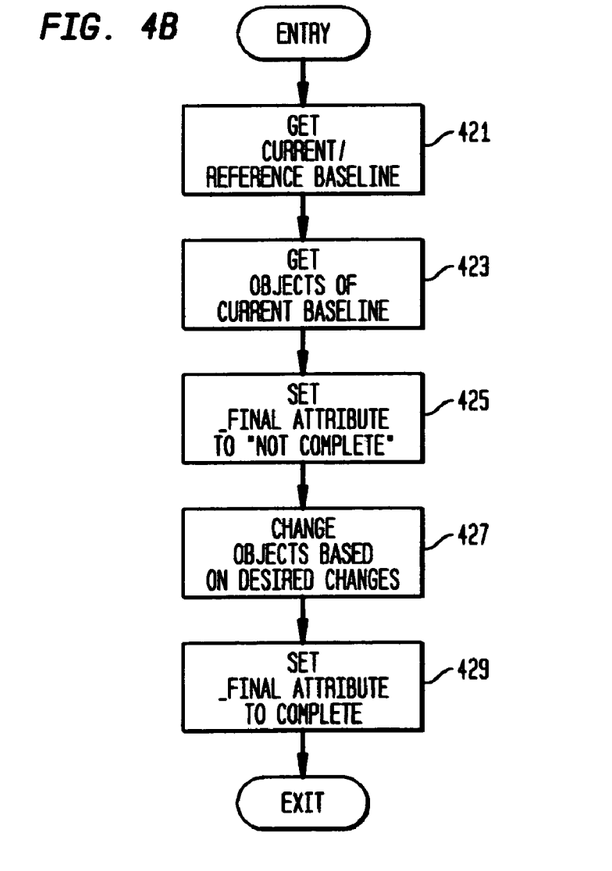
FIGS. 4B and 4C illustrates a flow chart and a pseudo-code representation of an exemplary method for implementing the processing shown in FIG. 4A.

FIG. 4B illustrates a flow chart of an exemplary process associated with the reference change generator in accordance with the principles of the invention. In this exemplary process, at block 421 the current or reference configuration model, referred to as a baseline or baseline model is obtained. At block 423, each of the blocks in the current baseline is obtained and the associated "_Final" attribute is set to "not-_complete." At block 427 the desired changes, as represented by block 415, FIG. 4A, are used to modify, amend or change associated objects in the reference or baseline configuration. The process in block 427 will result in several changes to the configuration baseline until all the "_Final" attributes are set to "complete" to indicate the completion of the desired operation. This operation may involve chaining of several templates to perform the desired operations. For example, the operation may involve the combination of deploy and replicate operations or the combination of replicate and edit operations.

Figure 4C:
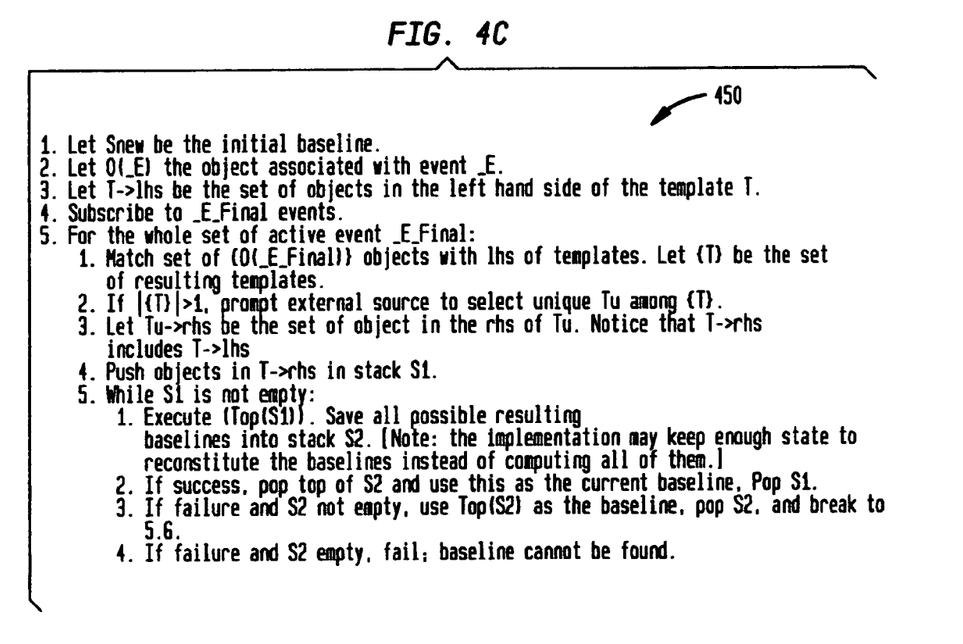

FIG. 4C illustrates a self-explanatory exemplary pseudo-code representation 450 of the exemplary processing shown in FIG. 4B.

Figure 5A:
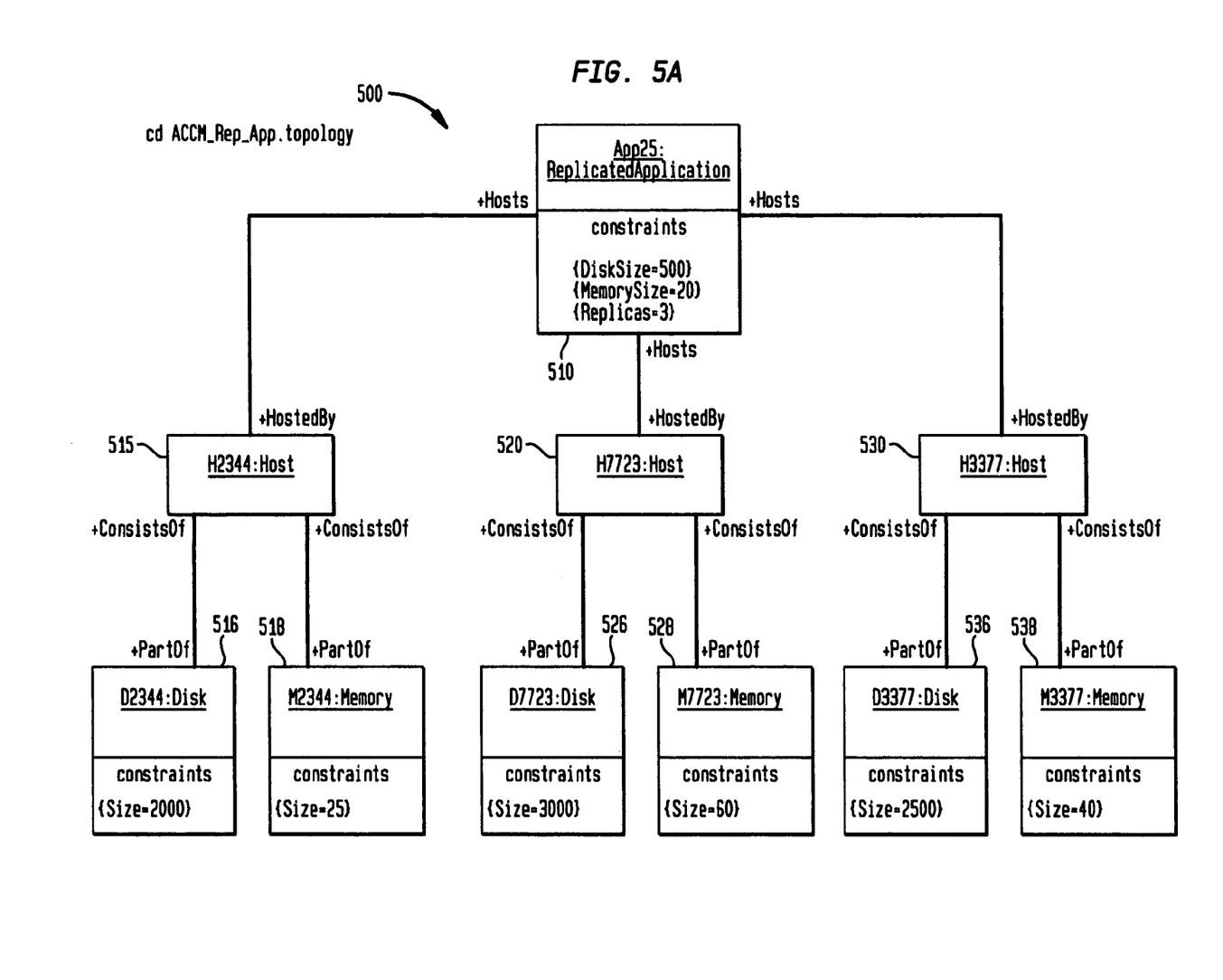
FIGS. 5A-5D collectively illustrate an example of the processing shown herein.
Figure 5B:
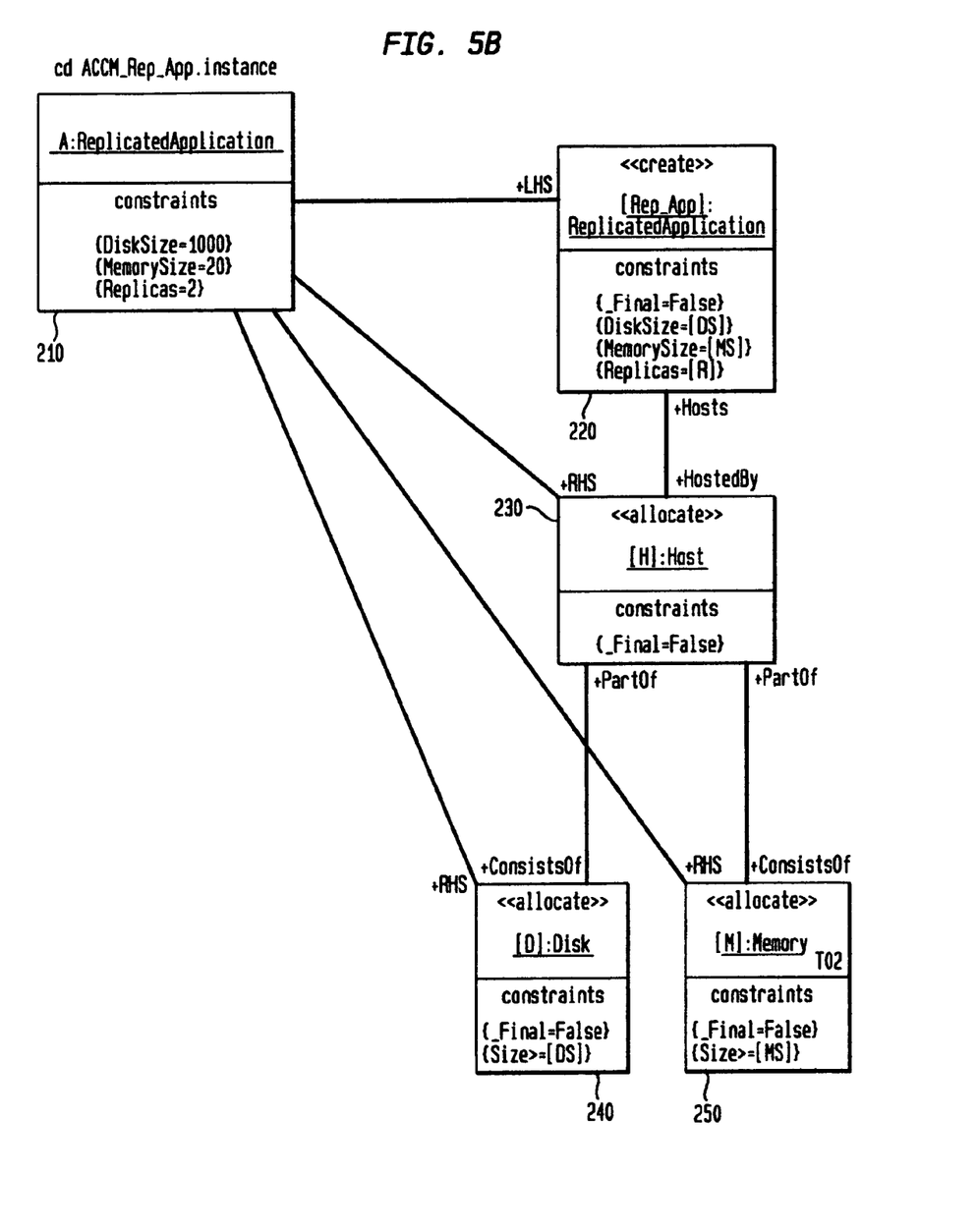
Figure 5C:
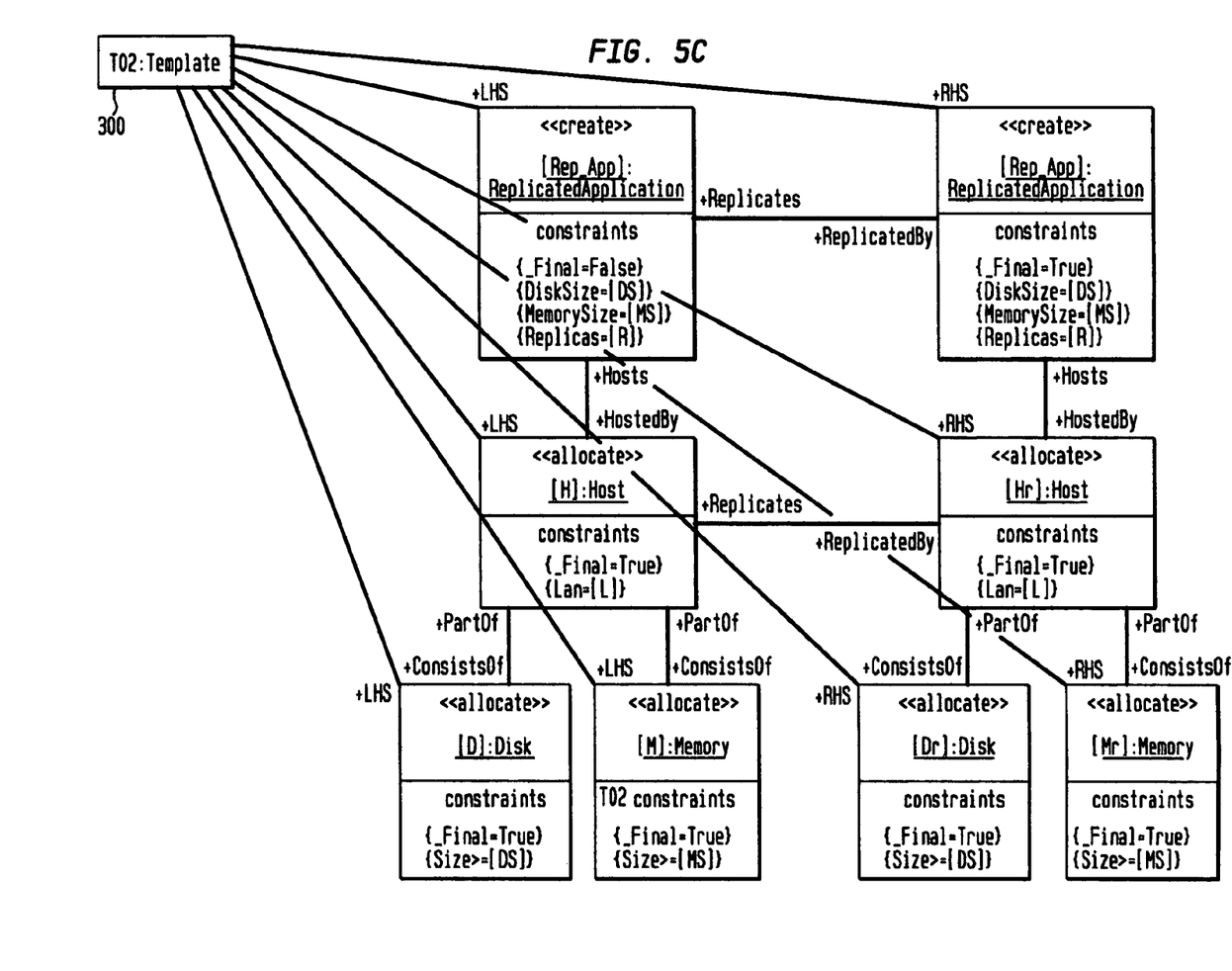

FIGS. 5A-5D collectively illustrate an example of the reference model change generator processing shown herein. In this exemplary example FIG. 5A illustrates the deployment of an application 510 on three servers, as represented by Host objects 515, 520, and 530. Each of the servers consists of a disk and a memory represented by Disk objects, 516, 526, and 536 and memory objects 518, 528 and 538, respectively. FIG. 5B illustrates the deployment of application 510 and FIG. 5C illustrates the replication of the application 510 using the deployment and replication templates shown in FIGS. 2A and 3, respectively. In this illustrated case, information regarding replication is provided by an administrator via an interface, as previously described. The provided information is then provided to the appropriate templates, e.g., replication and deployment, to replicate application 510 and deploy the replicated application.

Figure 5D:
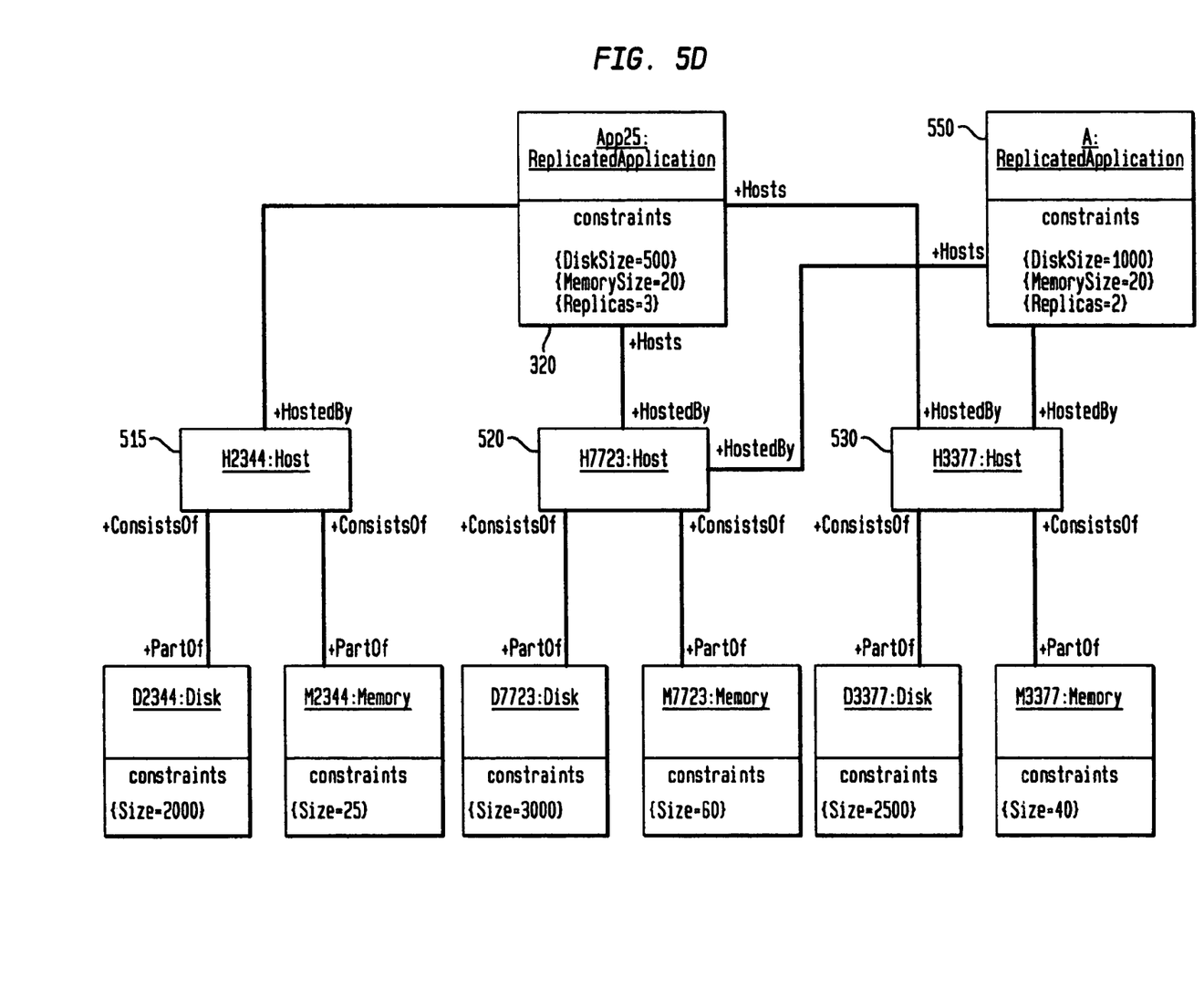

FIG. 5D illustrates the replication of application 510 as application 550, which is deployed on servers (Hosts) 520 and 530. In one aspect of the invention, the determination of the deployment of the application 550 may be based on the available resources on each Host. Returning to FIG. 5A, application 510 is shown to include exemplary constraints on the disk size (500) and the memory size 20. And from FIG. 5D, the replicated application 550 includes exemplary constraints of 1000 for Disk size and 20 for Memory size. These values may be provided by the administrator. In this aspect of the invention, application 550 is not able to be hosted on Host 515 as the memory size associated with this host, i.e., 25, is insufficient to accommodate the combined memory size of application 510 and 550, i.e., 20+20=40. Also shown as an object attribute is the number of hosts each of the applications resides. For application 510, the number of hosts upon which it resides is 3, while the number of host upon which application 550 resides is 2. This attribute may be provided by the administrator and provides a further limitation on the ability to perform the desired alterations or changes to the system.

Figure 6:
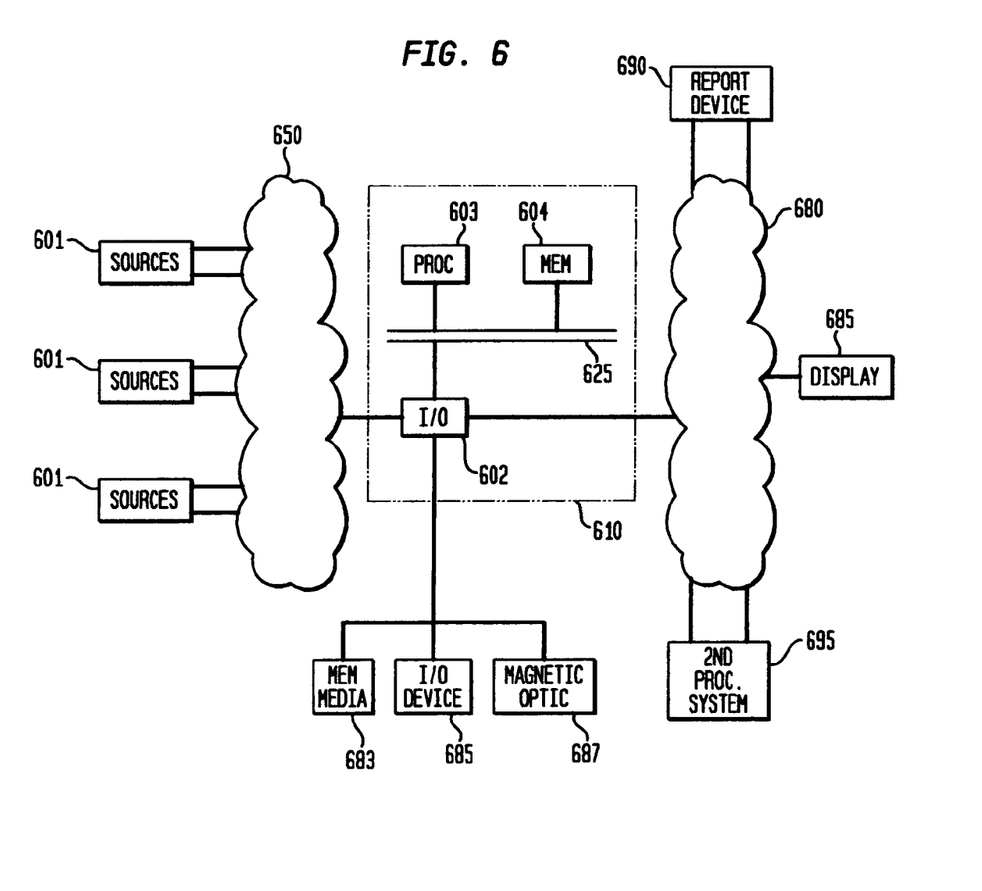
FIG. 6 illustrates an exemplary system for implementing the processing shown herein.

FIG. 6 illustrates an exemplary embodiment of a system or apparatus 600 that may be used for implementing the principles of the present invention. System 600 includes processing unit 610 that may contain one or more input/output devices 602, processors 603 and memories 604. I/O devices 602 may access or receive information from one or more sources or devices 601. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., INTRANET, as well as portions or combinations of these and other types of networks. Network 650 may similarly represent a communication bus, such as PCI, USB, Firewire, etc.

Input/output devices 602, processors 603 and memories 604 may communicate over a communication medium 625. Communication medium 625 may represent, for example, a bus, a communication network, one or more internal connections of a circuit, circuit card or other apparatus, as well as portions and combinations of these and other communication media. Input data from the devices 601 is processed in accordance with one or more programs that may be stored in memories 604 and executed by processors 603. Memory 604 may be selected preferably from semiconductor memories such as a Read-Only Memory (ROM), a Programmable ROM, a Random Access Memory, which is accessible through medium 625 or may be a cache memory in direct communication with processors 603. Processors 603 may be any means, such as general purpose or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 604. The code may be read or downloaded from a memory medium 683, an I/O device 685 or magnetic or optical media, such as a floppy disk, a CD-ROM or a DVD, 687, or over one or more networks, e.g., 650, 680, etc. The downloaded computer readable code may be stored in memory 604 or executed directly by processor 603. Further it would be understood that the code may be processor specific or processor non-specific. Code written in the Java programming language is an example of processor non-specific code. Java is a trademark of the Sun Microsystems Corporation.

Information from device 601 received by I/O device 602, after processing in accordance with one or more software programs operable to perform the functions illustrated herein, may also be transmitted over network 680 to one or more output devices represented as display 692, reporting device 690, e.g., printer, or second processing system 695. As would be recognized, network 680 may be physically the same as network 650 or may be a different network that operates on the same or different communication principles as that of network 650. Similarly, networks 650, 680 and bus 625 may be the same or different entities.

While there has been shown, and described fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, it would be understood by those skilled in the art that the system described herein may be network system containing components or entities that are remotely located, i.e., distributed, or a stand-alone system containing locally located, i.e., undistributed components.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for specifying and generating an alteration in a model representative of a system composed of a plurality of components, the method comprising the steps of:

associating configuration non-specific object template representations with corresponding functions operable on the model, each of the configuration non-specific object template representations includes representations of objects and attributes of, and/or relationships among system components;

associating configuration non-specific object template representations of desired changes to the model for enabling alterations to the objects, attributes, relationships and/or functions of the objects, attributes and relationships subject to constraints imposed by attributes of the system; and applying the configuration non-specific represented changes to the configuration of a baseline model representation of the system to generate a new configuration non-specific model where the changes have been applied.

2. An apparatus for specifying and generating an alteration in a model representative of a system composed of a plurality of components, the apparatus comprising:

a processor in communication with a memory, the processor executing code for:

associating configuration non-specific object template representations with corresponding functions operable on the model, each of the configuration non-specific object template representations includes representations of objects and attributes of, and/or relationships among system components;

associating configuration non-specific object template representations of desired changes to the model for enabling alterations to the objects, attributes, relationships and/or functions of the objects, attributes and relationships subject to constraints imposed by attributes of the system; and applying the configuration non-specific represented changes to the configuration of a baseline model.

* * * * *